Oct. 26, 1926.

W. H. BANFIL 1,604,252

HOSE NOZZLE

Filed May 5, 1922

Inventor.
William H. Banfil
by Heard Smith & Tennant.
Attys

Patented Oct. 26, 1926.

1,604,252

UNITED STATES PATENT OFFICE.

WILLIAM H. BANFIL, OF WATERTOWN, MASSACHUSETTS.

HOSE NOZZLE.

Application filed May 5, 1922. Serial No. 558,704.

This invention relates to improvements in nozzles for projecting a liquid under pressure and the object thereof is to provide a nozzle which can be readily manipulated to turn the liquid on or off.

More particularly the invention relates to improvements in hose nozzles for use upon chemical fire extinguishing devices and the object thereof is to provide a nozzle which can be readily and conveniently operated and which will not become obstructed by corrosion or accumulation of salts produced by deposition of the chemicals employed in the fire extinguisher.

A further object of the invention is to provide a simplified hose nozzle of the character described in which the escape of liquid from the nozzle will be confined to that which is projected through the tip of the nozzle.

In hose nozzles heretofore constructed considerable difficulty has been experienced in providing means for preventing the escape of the liquid along the stem of the inlet member which leads into the nozzle and complicated packing devices have been used to prevent the liquid from thus escaping.

A further object of the invention is to provide a simplified nozzle of a minimum number of parts in which the usual packing gland around the stem of the nozzle is dispensed with and a readily replaceable washer of fibrous material employed in place thereof.

Another object of the invention is to provide a novel means for delivering the liquid to the nozzle tip in such a manner that a uniform discharge of the liquid through the tip is insured and means provided to readily and completely shut off the flow of liquid through the tip.

Other objects and features of the invention will more fully appear from the following description and the accompanying drawings and will be pointed out in the claims.

Figure 1:
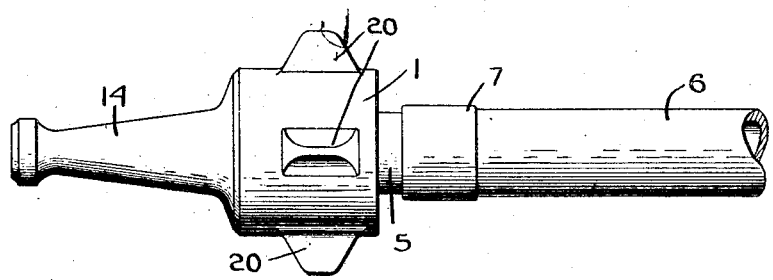
Figure 2:
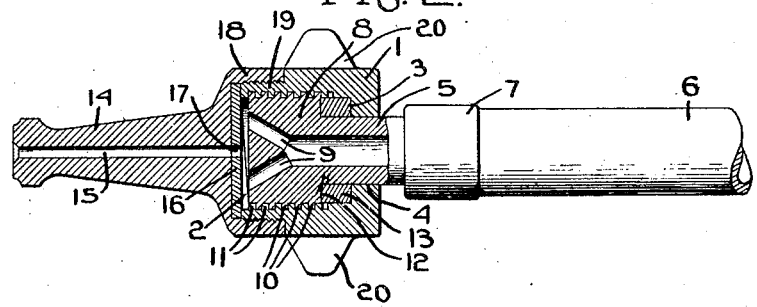

A preferred embodiment of the invention is illustrated in the accompanying drawings, in which, Fig. 1 is a side elevation of a nozzle connected to the end of a section hose;

Fig. 2 is a view of the nozzle in vertical axial section showing the parts of the nozzle in position to permit the discharge of liquid through the tip.

The preferred form of nozzle disclosed herein comprises a body 1 having a preferably cylindrical chamber 2 provided with a flat base 3 having a central aperture 4 to receive the stem of the inlet member. The inlet member comprises a stem 5 which is adapted to be connected to a hose 6 by a usual coupling 7. The inlet member is also provided with a head 8 shorter than the length of the cylindrical chamber and axially movable therein. The head is provided with a plurality of non-axial ports 9, (preferably three in number), which converge toward the axis of the inlet member and communicate with the conduit of the hollow stem 5.

Any desirable means may be provided for moving the head axially of the chamber in which it is located. Preferably the head is provided with peripheral screw threads 10 which engage complementary screw threads 11 in the wall of the chamber 2 so that relative rotative movement between the inlet member and the body of the nozzle will cause relative axial movement between said body and inlet member.

The rear face of the head 8 is provided with a flat shoulder 12 complementary to the base 3 of the chamber and a washer or sleeve 13 of fibrous material is interposed between the shouldered face of the head and the base of the chamber.

The nozzle is provided with a usual form of tip 14 having a central outlet aperture 15 which communicates axially with the chamber 2. The base portion of the nozzle is provided with a countersink in which a disk 16 of fibrous material is seated, said disk having a central aperture 17 which is in alinement with the aperture 15 in the nozzle tip. The tip is provided with an internally threaded skirt 18 which engages suitable complementary screw threads upon the reduced portion 19 of the body.

The body desirably is provided with a number of laterally extending lugs 20 adapted to be grasped by the operator for the purpose of producing relative rotation between the body and the inlet member.

As before stated the present invention is particularly adapted for use in connection with chemical fire extinguishers. Such fire extinguishers usually comprise a chamber containing a chemical solution into which an acid is discharged when the fire extinguisher is to be used so that the chemical action which occurs causes the production of carbon-dioxide or some other inert gas. The production of this gas immediately places the liquid under pressure and the gas which is discharged with the liquid serves also to smother the flame. The acid is usually contained in a receptacle within the chamber and is discharged into the liquid of the chamber by overturning the fire extinguisher. The liquid is discharged from the chamber when under pressure through a hose to the end of which a suitable nozzle is attached. In the present invention the end of the hose 6 is connected by a usual coupling to the stem 5 of the nozzle. When the nozzle has been thus attached to the hose the body 1 is rotated in a direction relative to the stem sufficiently to cause the flat end of the head 8 to press against the fibre disk 16, thus closing the ports 9.

When the device is to be used, and after the fire extinguisher has been overturned so as to produce the chemical action above described, the operator grasps the hose or stem with one hand and the body with the other and rotates the body in a direction to withdraw the flat end of the head from its contact with the fibre disk 9. This provides a chamber which communicates both with the ports 8 leading from the stem of the fire extinguisher and also with the discharge aperture 15 of the nozzle tip so that the liquid and gas from the extinguisher may be projected upon the flames.

When it is desired to shut off the liquid, the body is rotated in the opposite direction until the flat end of the head again contacts with the fibre disk 16.

By reason of this construction a uniform pressure is built up in the chamber just back of the nozzle tip when the head is removed from contact with the disk. When the head is retracted from its engagement with the disk the rear shoulder of the head engages the washer 13 and effectively prevents the flow of liquid along the stem. Inasmuch as the total axial movement of the head relatively to the nozzle tip is produced by about one-quarter of a turn of the head relatively to the stem the shoulder upon the head will be seated firmly against the washer 13 before any liquid can work along the threads of the screw. By reason of this construction the complicated packing gland, which has heretofore been employed in articles of this character, is eliminated. A much more economical construction is, therefore, produced and one which can be much more readily repaired.

It will be understood that the embodiment of the invention disclosed herein is illustrative and not restrictive and that various changes in form, construction and arrangement of parts may be made within the spirit and scope of the following claims.

Having thus described my invention, what I claim as new, and desire to secure by Letters Patent, is:

1. A nozzle comprising a chambered body, an inlet member having a hollow stem and a head fitting and substantially filling the chamber of said body and having a limited axial movement therein and provided with a non-axial outlet port communicating with said stem, a tip secured to said body having an axial outlet aperture communicating with said chamber, means positioned to close said non-axial port upon axial movement of said head to its limit in one direction, and means adapted to be engaged by said head upon movement to its limit in the opposite direction to effectively seal the joint between said body and stem, and means operable by less than a single full rotation of said chambered body relatively to said inlet member to move said body axially to the limit of its movement in either direction.

2. A nozzle comprising a chambered body, an inlet member having a hollow stem, a head fitting and substantially filling the chamber of said body and having a limited axial movement therein and provided with a non-axial outlet port communicating with said stem, a tip secured to said body having an axial outlet aperture communicating with said chamber, an axially apertured disc of fibrous material in said nozzle operable to close the non-axial port in said head upon movement of said head to its limit in one direction and a washer of fibrous material in said chamber surrounding said stem adapted to be engaged by said head when moved to its limit in the other direction to effectively seal the joint between said body and stem, and means operable by less than a single full rotation of said chambered body relatively to said inlet member to move said body axially to the limit of its movement in either direction.

In testimony whereof, I have signed my name to this specification.

WILLIAM H. BANFIL.